United States Patent
Chan

(10) Patent No.: US 7,046,602 B2
(45) Date of Patent: May 16, 2006

(54) PROCESS FOR COMPUTING ECCENTRIC AMOUNT OF DISK UPON ROTATING

(75) Inventor: Yi-Chung Chan, Taipei (TW)

(73) Assignee: Via Optical Solution, Inc., Shindian (TW)

( * ) Notice: Subject to any disclaimer, the term of this patent is extended or adjusted under 35 U.S.C. 154(b) by 652 days.

(21) Appl. No.: 10/209,589

(22) Filed: Jul. 30, 2002

(65) Prior Publication Data

US 2003/0099175 A1    May 29, 2003

(30) Foreign Application Priority Data

Nov. 29, 2001    (TW) ............... 90129513 A

(51) Int. Cl.
*G11B 5/58*    (2006.01)

(52) U.S. Cl. .............. 369/53.14; 369/53.28; 369/53.3

(58) Field of Classification Search ......... 369/53.14, 369/53.2, 53.28, 53.3, 54.14
See application file for complete search history.

(56) References Cited

U.S. PATENT DOCUMENTS

| | | | |
|---|---|---|---|
| 4,545,003 A * | 10/1985 | Hirano et al. ............. | 369/43 |
| 5,808,978 A | 9/1998 | Wang et al. | |
| 5,844,866 A * | 12/1998 | Fujimoto et al. ........ | 369/53.14 |
| 6,351,440 B1 * | 2/2002 | Fukuda et al. ........... | 369/47.36 |
| 2001/0019525 A1 | 9/2001 | Chan | |
| 2003/0123354 A1 * | 7/2003 | Takahashi ............... | 369/53.2 |

* cited by examiner

*Primary Examiner*—Gautam R. Patel
(74) *Attorney, Agent, or Firm*—Volpe and Koenig, P.C.

(57) ABSTRACT

A process for computing an eccentric amount of a disk upon rotating is provided. The process includes steps of starting a servo control system of a disk drive to rotate the disk at a specified angular velocity, measuring a track crossing speed of the servo control system at a focusing point on the disk, and computing the eccentric amount of the disk according to the specified angular velocity and the track crossing speed. A process for controlling rotation of a disk loaded in a disk drive is also provided. The process includes steps of realizing an eccentric amount of the disk, and rotating the disk at an operating speed corresponding to the eccentric amount.

13 Claims, 3 Drawing Sheets

PROCESS FOR COMPUTING ECCENTRIC AMOUNT OF DISK UPON ROTATING

FIELD OF THE INVENTION

The present invention relates to a process for computing an eccentric amount of a disk upon rotating, and to a process for controlling rotation of a disk. More particularly, the disk rotates at an optimal operating speed according to the eccentric amount.

BACKGROUND OF THE INVENTION

Optical disks such as compact disks (CDs), video compact disks (VCDs) and digital versatile disks (DVDs) are implemented via recording and reproducing apparatuses. When an optical pickup head of an optical disk operates, a light beam emitted by a light source such as laser light source is focused by an object lens to form a light spot on a plane thereof for recording information. With the fast development of optical disks, it is required to speed-up a disk drive to rotate the disk at a high angular velocity in order to enhance the access speed to the disk data. Unfortunately, referring to FIG. 1, an optical disk 10 is often imparted thereto an eccentric feature in the manufacturing process. In other words, there is generally a shift from the center of an ideal circle aperture 101, which is concentric to the disk, to the center of the real circle aperture 102. Such shift is defined as the eccentric amount C. The generic eccentric amount C of the disk will adversely influence the tracking performance of the optical pickup head especially under a high angular speed condition, and thus results in inferior data pickup performance.

When an optical disk is loaded into a disk drive and then clamped by a spindle motor, the center optical disk might be eccentric from the center of the disk drive, thereby resulting in a further eccentric amount. The eccentric amount is an indication reflecting an imbalance in a radial direction of the disk.

The pitch between two adjacent tracks (track pitch) is a constant, for example 1.6 μm for a standard compact disc and 0.74 μm for a digital versatile disc. Since the eccentric amount of the optical disk is significant compared to the tiny track pitch, the eccentric amount becomes a disturbance factor in the conventional servo control system. Especially when the eccentric amount is at a high level, the tracking control will be unstable and the tracking performance is degraded. Therefore, the data pickup performance for the disk drive is lowered when speeding up. A trial-and-error way is used to solve the problem by setting the disk at a maximum speed at first. Once the disk data cannot be normally accessed at such high speed, the angular speed of the disk is stepwise lowered until an acceptable value, i.e. an optimal speed, is reached. Then, the disk data is accessed at that optimal speed under the control of the servo control system. The time period the user has to wait for the trial-and-error procedure to enter the data pickup operation, however, is relatively long for today's requirement on speed.

SUMMARY OF THE INVENTION

It is an object of the present invention to provide a process for computing an eccentric amount of a disk upon rotating, which is provided for the servo control system to determine the optimal operating speed of the disk in short time.

It is another object of the present invention to provide a process for controlling rotation of a disk loaded in a disk drive, in which the eccentric amount is employed to determine the operating speed of the disk so as to increase its tracking performance in a servo control system.

In accordance with an aspect of the present invention, there is provided a process for computing an eccentric amount of a disk upon rotating. The process comprises steps of starting a servo control system of a disk drive to rotate the disk at a specified angular velocity, measuring a track crossing speed of the servo control system at a focusing point on the disk, and computing the eccentric amount of the disk according to the specified angular velocity and the track crossing speed.

In an embodiment, the disk is rotated at the specified angular velocity by monitoring an output signal from a pin FG of a control chip to control a rotating frequency of the disk.

In an embodiment, the track crossing speed is realized by measuring a frequency of a tracking error zero cross (TEZC) signal. The process further comprises a step of measuring a maximum track crossing speed at the focusing point of the disk provided that the disk rotates for at least half a turn. For example, the maximum track crossing speed is realized by measuring a maximum frequency of the tracking error zero cross (TEZC) signal.

In an embodiment, the eccentric amount c is computed by means of an equation:

$$c = p \times |Vzc(t)|_{max} / \omega$$

in which $|Vzc(t)|_{max}$ is the maximum track crossing speed of the servo control system, p is a track pitch of the disk, and $\omega$ is the specified angular velocity of the disk.

For example, the disk is one selected from a group consisting of a compact disk (CD), a video compact disk (VCD) and a digital versatile disk (DVD).

In accordance with another aspect of the present invention, there is provided a process for controlling rotation of a disk loaded in a disk drive. The process comprises steps of realizing an eccentric amount of the disk, and rotating the disk at an operating speed corresponding to the eccentric amount.

In an embodiment, the eccentric amount is realized by operating at least one parameter including an angular velocity of the disk, a maximum track crossing speed of a servo control system of the disk drive at a focusing point of the disk, and a track pitch of the disk. For example, the eccentric amount is realized according to an equation:

$$c = p \times |Vzc(t)|_{max} / \omega$$

in which $|Vzc(t)|_{max}$ is the maximum track crossing speed of the servo control system, p is a track pitch of the disk, and $\omega$ is the specified angular velocity of the disk.

In an embodiment, the operating speed is obtained by correlating the eccentric amount to a look-up table. In another embodiment, the operating speed is obtained according to a formula involving the eccentric amount.

In accordance with another aspect of the present invention, there is provided a process for controlling rotation of a disk loaded in a disk drive. The process comprises steps of realizing an eccentric amount of the disk, and rotating the disk at an operating speed corresponding to the eccentric amount, wherein the eccentric amount is realized according to an equation:

$$c = p \times |Vzc(t)|_{max} / \omega$$

in which $|Vzc(t)|max$ is the maximum track crossing speed of the servo control system, p is a track pitch of the disk, and ω is the specified angular velocity of the disk.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
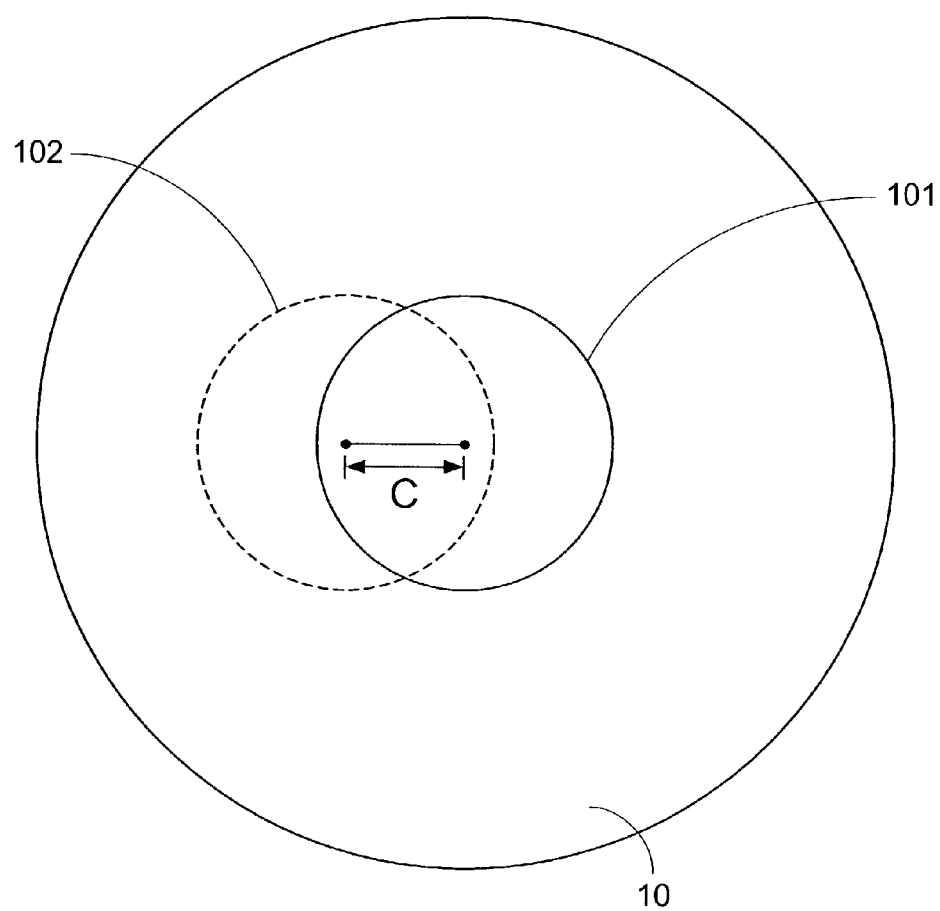
FIG. 1 schematically illustrates a typical optical disk with an eccentric feature.

According to the present invention, an eccentric amount of a disk is employed to determine the operating speed of the disk so as to increase its tracking performance in a servo control system. The eccentric amount is determined as follows.

The relative velocity Vld of an optical pickup head relative to the disk equals to the difference between the velocity Vl of the optical pickup head and the velocity Vd of the disk, i.e.

$$Vld = Vl - Vd \qquad (1).$$

At the beginning of the operation of a disk drive, a focusing servo control system of the disk drive is locked to hold the optical pickup head steady. Thus, the optical pickup head velocity Vl=0, and $$Vd(t) = -Vld(t) \qquad (2).$$

In a co-pending U.S. patent application Ser. No. 09/789,622 entitled "METHOD AND APPARATUS APPLIED IN AN OPTICAL STORAGE DEVICE FOR ESTIMATING RADIAL SPEED OF DISC", filed Feb. 22, 2001, the equation $Vld(t) \approx c \times \omega \times \sin(\omega t)$ is derived. Thus, it is estimated that $$Vd(t) = -c \times \omega \times \sin(\omega \times t) \qquad (3), \text{ and}$$

$$|Vd(t)| = |c \times \omega \times \sin(\omega t)| \leq c \times \omega \qquad (4),$$

in which c is the eccentric amount, ω is an angular velocity of the disk, and t is time. In other words, a maximum velocity $|Vd(t)|max$ of the disk equals to $c \times \omega$ on the condition of $|\sin(\omega t)|=1$, i.e.

$$|Vd(t)|max = c \times \omega \qquad (5).$$

Thus, the eccentric amount of c can be obtained by means of the following equation:

$$c = |Vd(t)|max/\omega \qquad (6).$$

Figure 2:
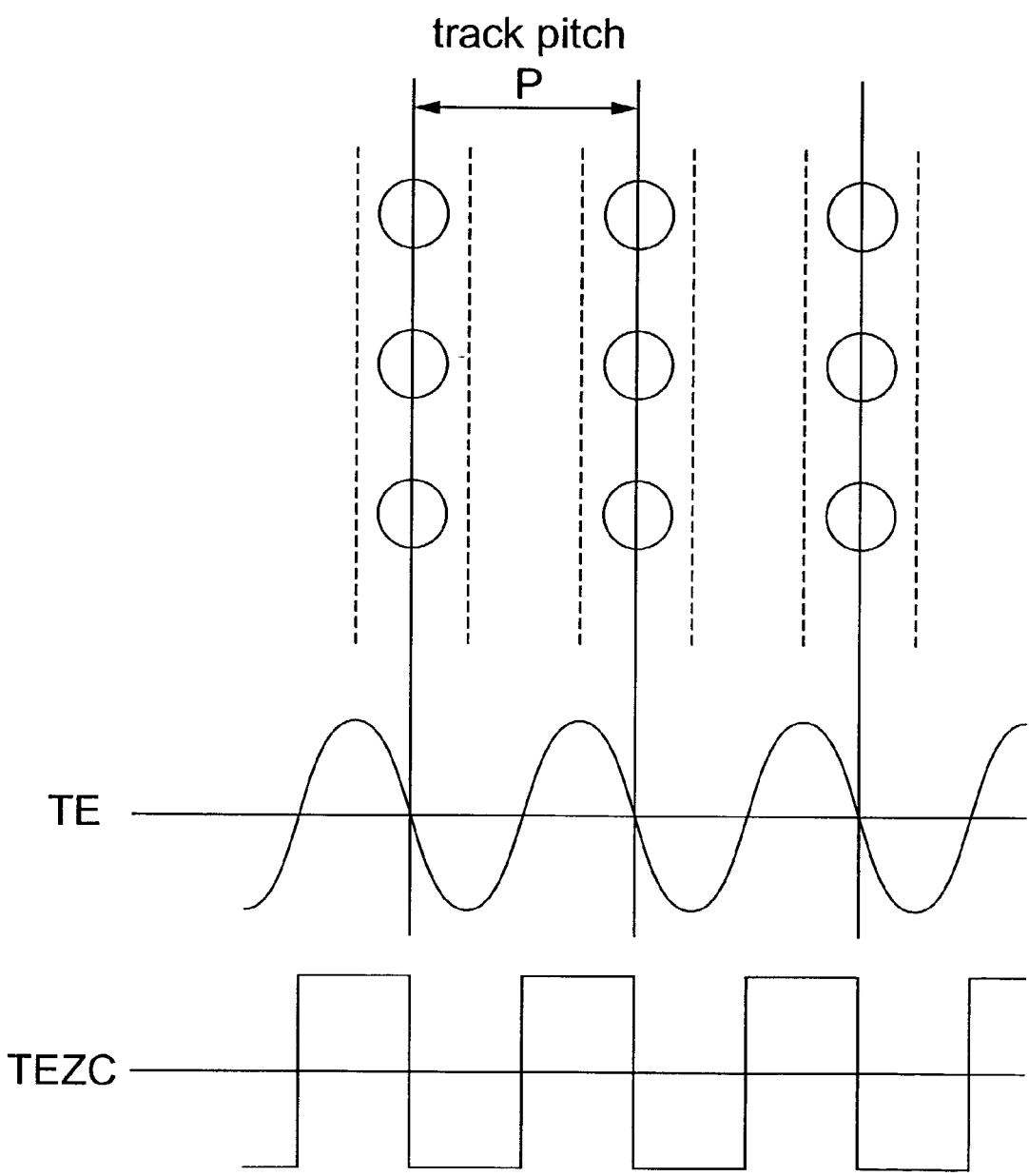
FIG. 2 is a diagram illustrating a relation between a track pitch, a tracking error (TE) signal and a tracking error zero crossing (TEZC) signal.

During operation, a focusing error and a tracking error usually arise on the rotating disk. The focusing error is generally caused by vibration of the disk in the axial direction, and the tracking error is generally caused by eccentricity of the disk. In a conventional servo control system, a tracking error (TE) signal is utilized to adjust the position of the optical pickup head and perform tracking servo. A zero crossing point detector circuit (not shown) is used to detect a zero crossing point of the TE signal such that a tracking error zero crossing (TEZC) signal is generated. Please refer to FIG. 2, when the optical pickup head crosses one track, the TEZC signal reveals one pulse wave accordingly. By computing the pulse wave number of the TEZC signal, the number of tracks that the optical pickup head has crossed in the seeking procedure is obtained, and the movement of the optical pickup head between the inner tracks and the outer tracks can be controlled in accordance with the computation.

Based on the above-mentioned concept, a track crossing velocity Vzc(t) (track/sec) is generated by measuring a frequency of the TEZC signal. As one skilled in the art should know, the velocity Vd(t) of the disk is equal to the product of the track crossing velocity Vzc(t) and the track pitch, i.e.

$$Vd(t) = p \times Vzc(t) \qquad (7),$$

and the absolute value of Vd(t) is $$|Vd(t)|max = p \times |Vzc(t)|max \qquad (8),$$

where $|Vzc(t)|max$ is a maximum track crossing velocity of the servo control system. The track pitch p, for example, is 1.6 μm for an optical disk, and 0.74 μm for a digital versatile disk. According to the equation (6), $$c = p \times |Vzc(t)|max/\omega \qquad (9), \text{ and}$$

$$c' = c/p = |Vzc(t)|max/\omega \qquad (10).$$

In other words, the eccentric amount or unitary eccentric amount can be obtained by the arithmetic operation of the maximum track crossing velocity of the servo control system and the angular velocity of the disk.

Figure 3:
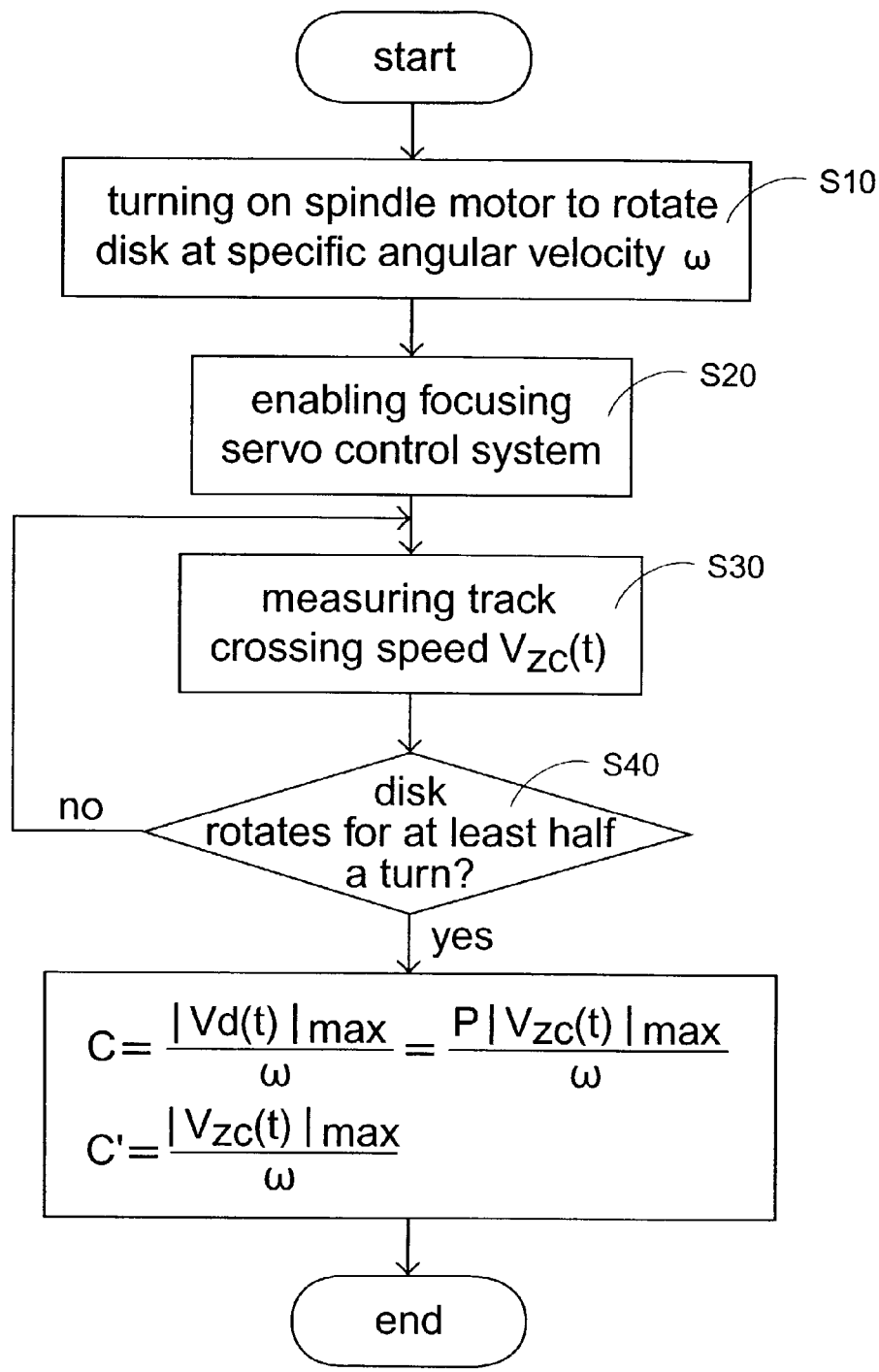
FIG. 3 is a flowchart illustrating a preferred process for computing an eccentric amount of a disk according to the present invention.

In order to illustrate the process for computing the eccentric amount in more details, a flowchart according to a preferred embodiment of the present invention is shown in FIG. 3. In step S10, a spindle motor is turned on, and the disk is controlled to rotate at a specified angular velocity ω. The angular velocity ω is defined by 2πf, where f is a rotating frequency of the disk. For example, angular velocity ω=80π when the rotating frequency f is 40 Hz. It is known that the rotating frequency f can be obtained by monitoring an output signal from a pin FG (not shown) of a control chip and controlled accordingly. Then, a focusing servo control system is enabled (step S20), and a track crossing speed Vzc of the servo control system at a focal point on the disk is measured (step S30). The track crossing speed Vzc is obtained by measuring a frequency of a TEZC signal. When the disk rotates for at least half a turn, the maximum track crossing speed $|Vzc(t)|max$ at the focal point of the disk is measured (Step S40). In such way, the eccentric amount c or c' of a disk is computed according to the equation (9) or (10).

Since the eccentric amount can be easily computed in accordance with the present invention, the eccentric amount becomes a major factor for determining an operating speed of a disk. For example, a series of experiments concerning the relationships of eccentric amounts and optimal operating speeds can be done to obtain a look-up table or a formula in advance. Thus, when a variety of disks are to be loaded in a disk drive, an optimal operating speed will be quickly obtained by correlating the eccentric amount of the loaded individual disk to a look-up table or in accordance with the formula. It is known to a person skilled in the art that the tracking performance of a disk in a servo control system will be highly increased due to a shorter time period to enter the data pickup operation, and thus the problems of the traditional trial-and-error way will be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for computing an eccentric amount of a disk upon rotating, said process, comprising steps of:
   starting a servo control system of a disk drive to rotate said disk at a specified angular velocity;
   measuring a maximum track crossing speed $|Vzc(t)|max$ of said servo control system at a focal point on said disk; and
   computing said eccentric amount c of said disk according to said specified angular velocity $\omega$, said maximum track crossing speed $|Vzc(t)|max$, and a track pitch p of said disk, wherein $c = p \times |Vzc(t)|max/\omega$.

2. The process according to claim 1, wherein said specified angular velocity correlates to a rotating frequency of said disk.

3. The process according to claim 1, wherein said track crossing speed is obtained by measuring a frequency of a tracking error zero cross (TEZC) signal.

4. The process according to claim 3 wherein said maximum track crossing speed at said focal point of said disk is measured provided that said disk rotates for at least half a turn.

5. The process according to claim 4, wherein said maximum track crossing speed is obtained by measuring a maximum frequency of said tracking error zero cross (TEZC) signal.

6. The process according to claim 1, wherein said disk is selected from a group consisting of a compact disk (CD), a video compact disk (VCD) and a digital versatile disk (DVD).

7. A process for controlling rotation of a disk loaded in a disk drive, comprising:
   determining an eccentric amount of said disk according to a mathematical operation of a maximum track crossing speed of a servo control system of said disk drive at a focal point of said disk, a track pitch of said disk, and a specified angular velocity of said disk; and
   rotating said disk at an angular speed corresponding to said eccentric amount, wherein said eccentric amount is obtained according to an equation:

$$c = p \times |Vzc(t)|max/\omega$$

in which $|Vzc(t)|max$ is said maximum track crossing speed of said servo control system, p is a track pitch of said disk, and $\omega$ is said specified angular velocity of said disk.

8. The process according to claim 7, wherein said specified angular velocity correlates to a rotating frequency of said disk.

9. The process according to claim 7, wherein said maximum track crossing speed is obtained by measuring a maximum frequency of a tracking error zero cross (TEZC) signal.

10. The process according to claim 7, wherein said angular speed is obtained by correlating said eccentric amount to a look-up table.

11. The process according to claim 7, wherein said angular speed is obtained according to a formula involving said eccentric amount.

12. The process according to claim 7 wherein said disk is selected from a group consisting of a compact disk (CD), a video compact disk (VCD) and a digital versatile disk (DVD).

13. A process for controlling rotation of a disk loaded in a disk drive, comprising:
   obtaining an eccentric amount of said disk; and
   rotating said disk at an operating speed corresponding to said eccentric amount, wherein said eccentric amount is realized according to an equation:

$$c = p \times |Vzc(t)|max/\omega$$

where $|Vzc(t)|max$ is said maximum track crossing speed of said servo control system, p is a track pitch of said disk, and $\omega$ is said specified angular velocity of said disk.

* * * * *